US009591235B2

(12) United States Patent
Li et al.

(10) Patent No.: US 9,591,235 B2
(45) Date of Patent: Mar. 7, 2017

(54) METHOD AND DEVICE FOR IMAGE TAKING BRIGHTNESS CONTROL AND COMPUTER READABLE STORAGE MEDIUM

(71) Applicant: HISENSE MOBILE COMMUNICATIONS TECHNOLOGY CO., LTD., Qingdao (CN)

(72) Inventors: Bing Li, Qingdao (CN); Changsheng Zhou, Qingdao (CN); Sanfeng Yan, Qingdao (CN); Biao Zhou, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 0 days.

(21) Appl. No.: 14/728,046

(22) Filed: Jun. 2, 2015

(65) Prior Publication Data
US 2016/0127655 A1 May 5, 2016

(30) Foreign Application Priority Data

Oct. 30, 2014 (CN) .......................... 2014 1 0604162

(51) Int. Cl.
H04N 5/235 (2006.01)
H04N 9/73 (2006.01)
(Continued)

(52) U.S. Cl.
CPC ........... *H04N 5/243* (2013.01); *H04N 5/2351* (2013.01); *H04N 5/2353* (2013.01); *G03B 7/093* (2013.01)

(58) Field of Classification Search
CPC . G06T 5/009; G06T 5/50; G06T 2207/10016; G06T 5/40;
(Continued)

(56) References Cited

U.S. PATENT DOCUMENTS

2011/0187914 A1* 8/2011 Lee ........................ H04N 5/222
348/333.11
2011/0279710 A1* 11/2011 Lee ...................... H04N 5/2351
348/234

* cited by examiner

Primary Examiner — Trung Diep
(74) Attorney, Agent, or Firm — Harness, Dickey & Pierce, P.L.C.

(57) ABSTRACT

Embodiments of the present disclosure provide a method for controlling the brightness of a shot image by controlling an exposure parameter used when the image is taken on the basis of the distribution condition of detail features comprised in each brightness class area of an image frame in a preview image frame. The method includes the operations of acquiring a preview image frame, and determining the brightness level n of each pixel in the preview image frame; dividing the preview image frame into M class areas according to the determined brightness level n of each pixel; determining an exposure adjustment level required when the preview image frame is taken according to the distribution condition of detail features comprised in each class area in the preview image frame; and adjusting a pre-acquired exposure parameter according to the determined exposure adjustment level, and taking an image according to the adjusted exposure parameter.

15 Claims, 6 Drawing Sheets

(51) Int. Cl.
*H04N 5/243* (2006.01)
*G03B 7/093* (2006.01)

(58) Field of Classification Search
CPC .......... G06T 2207/20201; G06T 5/003; G03B 13/02; H04N 5/23248; H04N 5/23267; H04N 5/23293; H04N 5/243
USPC .... 348/222.1, 223.1, 234, 235, 333.12, 362, 348/371
See application file for complete search history.

METHOD AND DEVICE FOR IMAGE TAKING BRIGHTNESS CONTROL AND COMPUTER READABLE STORAGE MEDIUM

CROSS-REFERENCE TO RELATED APPLICATION

This application claims the benefit and priority of Chinese Patent Application No. 201410604162.6 filed Oct. 30, 2014. The entire disclosure of the above application is incorporated herein by reference.

FIELD

The present disclosure relates to the field of image processing, and in particular relates to a method and device for image taking brightness control and a computer readable storage medium.

BACKGROUND

This section provides background information related to the present disclosure which is not necessarily prior art.

As photographic equipment becomes increasingly popular, exposure control gradually becomes a function attracting more attention of users of the photographic equipment. Besides pursuing a special exposure effect, users generally require reasonably exposing images to obtain richer picture information and avoid information loss, so the automatic exposure function is very necessary for common users. The premise of exposure control is to test light of a current scenario and then carry out image taking.

SUMMARY

This section provides a general summary of the disclosure, and is not a comprehensive disclosure of its full scope or all of its features.

Some embodiments of the present disclosure provide a method for image taking brightness control, including:
acquiring a preview image frame, and determining the brightness level n of each pixel in the preview image frame;
dividing the preview image frame into M class areas according to the determined brightness level n of each pixel;
determining an exposure adjustment level required when the preview image frame is taken according to the distribution condition of detail features included in each class area in the preview image frame; and
adjusting a pre-acquired exposure parameter according to the determined exposure adjustment level, and taking an image according to the adjusted exposure parameter.

Some embodiments of the present disclosure further provide a device for image taking brightness control, including a memory and one or more processors, wherein the memory stores one or more computer readable program codes, and the one or more processors are used for executing the one or more computer readable program codes to perform:
acquiring a preview image frame, and determining the brightness level n of each pixel in the preview image frame;
dividing the preview image frame into M class areas according to the determined brightness level n of each pixel;
determining an exposure adjustment level required when the preview image frame is taken according to the distribution condition of detail features included in each class area in the preview image frame; and
adjusting a pre-acquired exposure parameter according to the determined exposure adjustment level, and taking an image according to the adjusted exposure parameter.

Some embodiments of the present disclosure further provide a computer readable storage medium in which instruction codes are stored, wherein when the instruction codes are executed, user equipment at least carries out the following operations:
acquiring a preview image frame, and determining the brightness level n of each pixel in the preview image frame;
dividing the preview image frame into M class areas according to the determined brightness level n of each pixel;
determining an exposure adjustment level required when the preview image frame is taken according to the distribution condition of detail features included in each class area in the preview image frame; and
adjusting a pre-acquired exposure parameter according to the determined exposure adjustment level, and taking an image according to the adjusted exposure parameter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
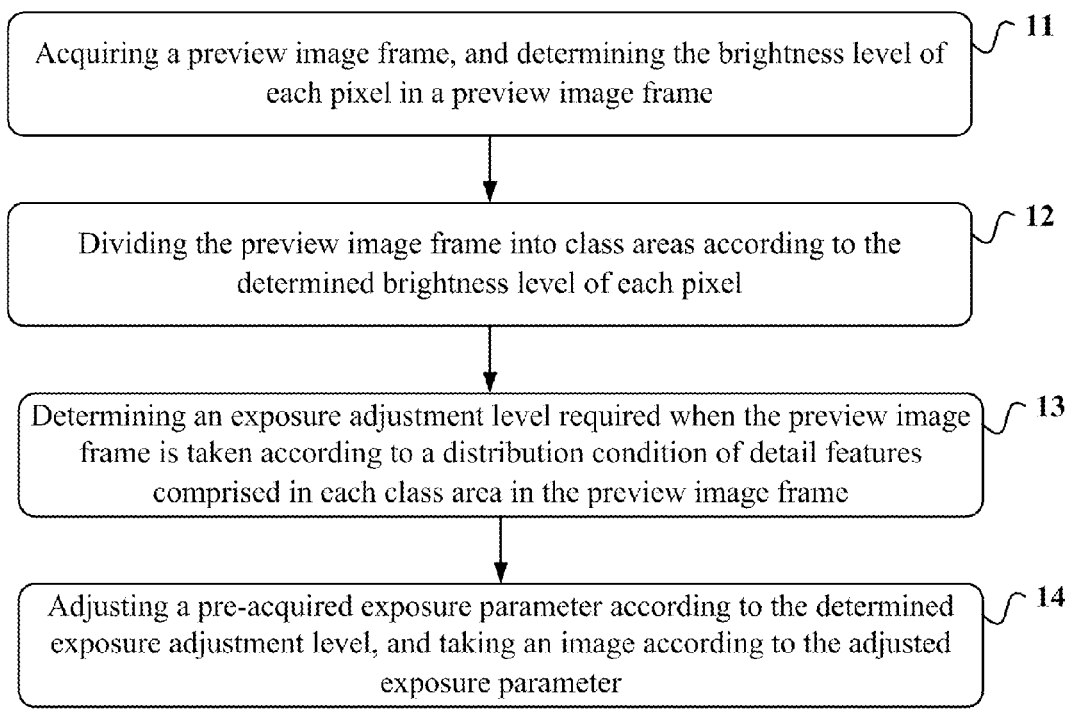
FIG. 1 is a flow schematic diagram of an image taking brightness control method in some embodiments of the present disclosure.

Example embodiments will now be described more fully with reference to the accompanying drawings.

The embodiments of the disclosure divide the preview image frame into M class areas according to the determined brightness level n of each pixel, and thus achieve multiple class areas; after determines the class areas, different from the prior art, the disclosure determines an exposure adjustment level required when the preview image frame is taken according to the distribution condition of detail features included in each class area in the preview image frame, and then takes an image according to the determined adjusted exposure parameter and the exposure adjustment level; thus, since human eyes have different resolution to the detail features with different brightness, and taking rich details and clear image needs to determine appropriate exposure parameters for the scene, the embodiments in the disclosure determines the exposure parameters according to the distribution condition of detail features, and thus controls the brightness the image, shows more detail features, and thus makes the image include more details.

The method for metering in the prior art includes: average metering, spot metering, estimation metering, manual metering, etc. The average metering is calculating the average lightness of the whole image, and then determines the lightness of the current scene; the spot metering only selects several special spots in the scene, and performs a weighted calculating to estimate the lightness of the current scene, the manual metering is estimating the current scene by evaluate lightness of an area manually specified by the user. The average metering is suitable for most scenes, but the effect of the average metering is not very well in some special scenes such like a backlight scene, a scene that is taking the outdoor image through a window, and a scene that is taking the image by pointing the camera at a light; the only advantage of the spot metering is the calculating speed is fast, since the sampling range of the spot metering is small, it is easy to occur an automatic exposure oscillation phenomenon; the estimation metering is an extension of the spot metering, wherein the special spots in the spot metering are extended to special areas in the estimation metering, and weighted calculating is performed according to the lightness of the special areas, the estimation metering could reduce the possibility of causing the automatic exposure oscillation phenomenon, but the effect of the estimation metering is still not very well in some special scenes; the manual metering needs the user to choose the metering range, however, most users are short of photography knowledge, how to choose the metering range and whether the choose metering range is reasonable are always bothering the users.

In view of the defects of the prior art, a method to achieve better exposure parameter, to control the brightness of the image is needed.

The embodiments of the present disclosure may be applied to various terminals with taking function, such as smart phones, tablet computers and cameras. Some embodiments of the present disclosure provide a method for performing brightness control on image taking based on the distribution condition of detail features included in each class area in an image frame. In some embodiments of the present disclosure, an area (namely a subarea A(i, j)) of a plurality of pixels which are adjacent to each other and belong to the same brightness level is determined according to the brightness level n of each pixel in a preview image frame, and all subareas in the preview image frame are divided into M class areas according to a preset brightness range of the brightness levels to which all the subareas in the preview image frame attribute; after each class area is determined, the distribution condition of detail features included in each class area in the preview image frame may be analyzed and counted, so as to determine an exposure adjustment level required when the preview image frame is taken; image taking brightness control is performed on the preview image frame according to a preset exposure parameter and the determined exposure adjustment level; when the current scenario belongs to a backlight taking scenario or other special taking scenario and image processing is performed by using a method of average metering, spot metering, estimated metering, manual metering or the like in the prior art, image processing may not be performed according to the brightness of the actual scenario, for the brightness sensing range and sensitivity of human eyes have great difference, human eyes have high sensitivity to image details only within a certain brightness range, and therefore most detail features of an image may not be well presented to a user. However, by using some embodiments of the present disclosure, the exposure adjustment level may be determined according to the distribution condition of detail features included in each brightness class area of the image frame in the preview image frame; and brightness control may be performed on image taking according to the preset exposure parameter and the determined exposure adjustment level, so that more detail features may be displayed within a recognizable range of human eyes.

FIG. 1 shows a flow schematic diagram of an image taking brightness control method provided by some embodiments of the present disclosure. As shown in FIG. 1, the method may include:

operation 11, acquiring a preview image frame, and determining a brightness level n of each pixel in the preview image frame;

operation 12, dividing the preview image frame into M class areas according to the determined brightness level n of each pixel, wherein M is a positive integer;

operation 13, determining an exposure adjustment level required when the preview image frame is taken according to the distribution condition of detail features included in each class area in the preview image frame; and operation 14, adjusting a pre-acquired exposure parameter according to the determined exposure adjustment level, and taking an image according to the adjusted exposure parameter.

Optionally, in operation 13, a feature weight of each class area in the preview image frame is calculated; for any class area, a ratio of the feature weight of the class area to the sum of the feature weights of all the class areas is determined as a feature weight ratio of the class area; and the exposure adjustment level required when the preview image frame is taken is determined according to the feature weight ratio of each class area.

Optionally, in the above operations, for any class area, a detail feature value of each subarea in the class area is calculated; total detail feature values of all subareas in the class area are counted; the pixel ratio of the number of pixels in the class area to a total number of pixels of the preview image frame is calculated; and the feature weight of the class area in the preview image frame is determined according to the calculated pixel ratio and the counted total detail feature values.

Optionally, in operation 12 above, an area of a plurality of pixels which are adjacent to each other and belong to the same brightness level is determined as a subarea A(i, j), the brightness level of the subarea is i and i∈(0, n), an identification number of the subarea is J and j∈(0, m), wherein m is the total number of subareas of which the brightness levels are i in the preview image frame; and all the subareas in the preview image frame are divided into M class areas according to a preset brightness range of the brightness levels to which all the subareas in the preview image frame attribute.

Optionally, in the above operations, when M=3, the preview image frame is divided into a low brightness class area, a medium brightness class area and a high brightness class area; if the brightness level i of a subarea A(i, j) belongs to a first preset brightness range, the subarea is determined as a subarea in the low brightness class area; if the brightness level i of a subarea A(i, j) belongs to a second preset brightness range, the subarea is determined as a subarea in the medium brightness class area; and if the brightness level i of a subarea A(i, j) belongs to a third preset brightness range, the subarea is determined as a subarea in the high brightness class area.

Optionally, in the above operations, if the feature weight ratio of the medium brightness class area is greater than or equal to a first preset threshold, the exposure adjustment level required when the preview image frame is taken is zero; otherwise, the difference absolute value of the feature weight ratio of the low brightness class area and the feature weight ratio of the high brightness class area is calculated, and whether the difference absolute value is smaller than or equal to a second preset threshold is judged; if so, the exposure adjustment level required when the preview image frame is taken is zero; otherwise, whether the feature weight ratio of the low brightness class area is greater than the feature weight ratio of the high brightness class area is judged, if being greater, e satisfying the maximum of $$CK(e) = \sum_{i=(E-e)*(x/E)}^{i+x/E} K(i)$$

is determined as the exposure adjustment level required when the preview image frame is taken; if being smaller, e satisfying a maximum of $$CK(e) = \sum_{i=y+(e+1)*(RMAX-y)/E}^{i+(RMAX-y)/E} K(i)$$

is determined as the exposure adjustment level required when the preview image frame is taken, wherein e is the exposure adjustment level, $e \in \{-E, -E+1, \ldots, -1, 0, 1, \ldots, E-1, E\}$ and E is a preset adjustable positive number.

Optionally, in operation 14 above, when the determined exposure adjustment level is zero, taking is performed according to the pre-acquired exposure parameter; when the determined exposure adjustment level is negative, the pre-acquired exposure parameter is attenuated according to the exposure adjustment level, and taking is performed according to the attenuated exposure parameter; and when the determined exposure adjustment level is positive, the pre-acquired exposure parameter is compensated according to the exposure adjustment level, and taking is performed according to the compensated exposure parameter.

Optionally, in the above operations, the pre-acquired exposure parameter is attenuated according to the exposure adjustment level, and taking is performed according to the attenuated exposure parameter, namely the exposure time length used when the preview image frame is taken according to the exposure adjustment level; the pre-acquired exposure parameter is compensated according to the exposure adjustment level, and taking is performed according to the compensated exposure parameter, namely the exposure time length used when the preview image frame is taken is prolonged according to the exposure adjustment level.

Optionally, after the image is taken according to the adjusted exposure parameter, the method further includes: adjusting the brightness of the shot image according to a preset image processing model.

The embodiments of the present disclosure will be described below.

Figure 2:
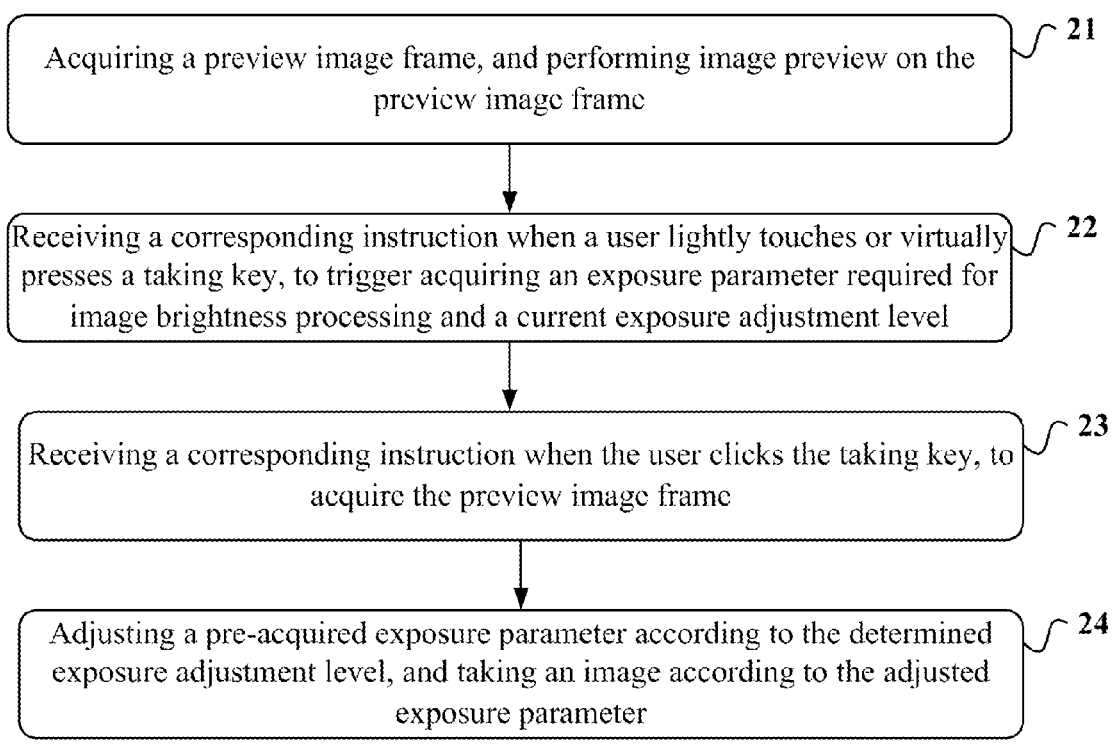
FIG. 2 is a schematic diagram of a taking flow in some embodiments of the present disclosure.

FIG. 2 shows a schematic diagram of a taking flow in some embodiments of the present disclosure. As shown in FIG. 2, the flow includes:

operation 21, acquiring a preview image frame, and performing image preview on the preview image frame;

operation 22, receiving a corresponding instruction when a user lightly touches or emptily presses a taking key, to trigger acquiring an exposure parameter required for image brightness processing and a current exposure adjustment level;

operation 23, receiving a corresponding instruction when the user clicks the taking key, to acquire the preview image frame again; and operation 24, adjusting the pre-acquired exposure parameter according to the determined exposure adjustment level, and taking the preview image frame according to the adjusted exposure parameter.

The image brightness processing method provided by some embodiments of the present disclosure may be applied to the image processing process taking the above-mentioned taking flow as an example, to improve the proportion of detail features which may be recognized by human eyes in an image.

Taking a smart phone for taking images as an example, the image taking brightness control process will be described in some embodiments of the present disclosure.

Figure 3:
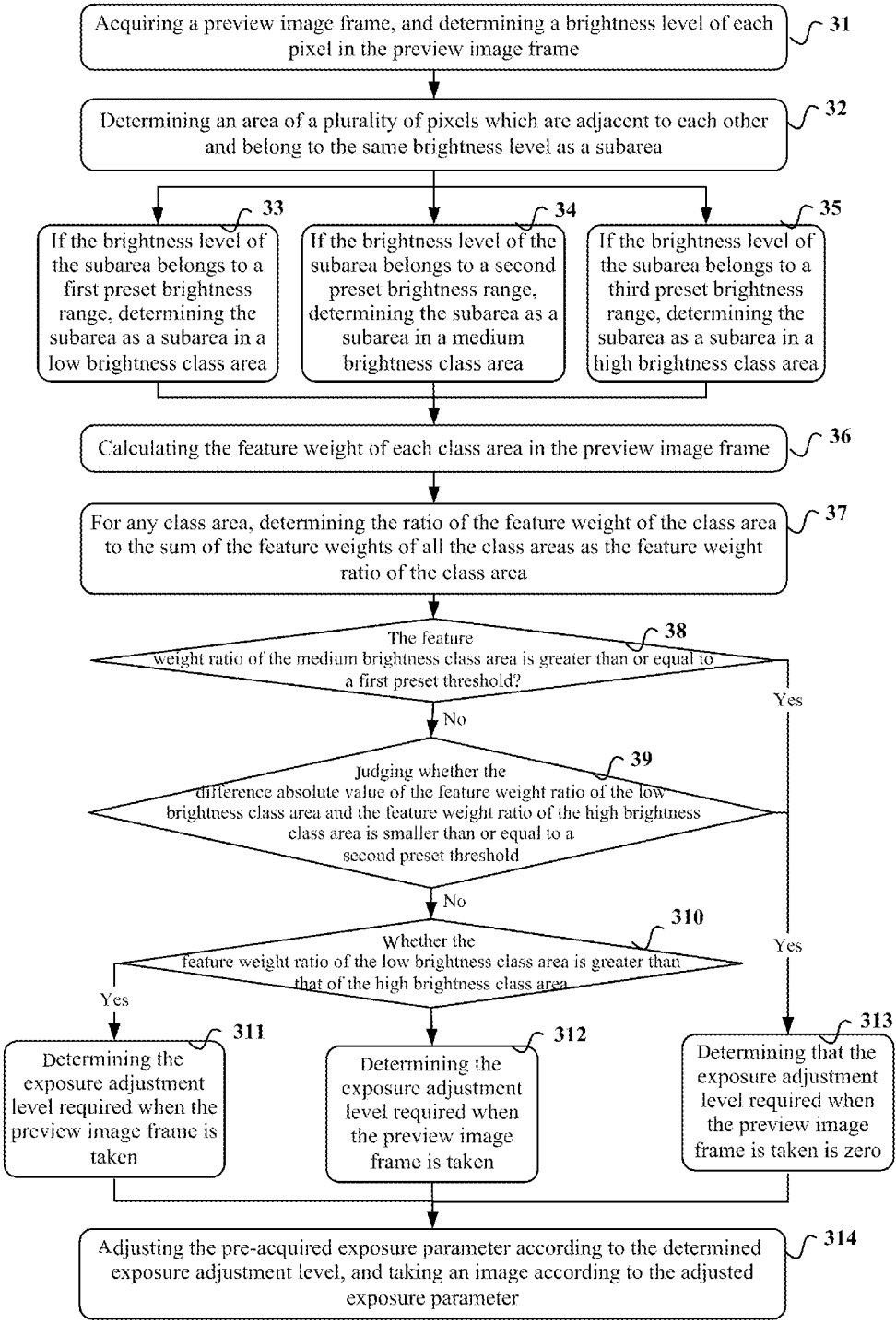
FIG. 3 is a flow schematic diagram of a method for performing brightness control on image taking based on the distribution condition of detail features included in each class area in a preview image frame in some embodiments of the present disclosure.

FIG. 3 shows a flow schematic diagram of a method for performing brightness control on image taking based on the distribution condition of detail features included in each class area in a preview image frame in some embodiments of the present disclosure. As shown in FIG. 3, the flow may include the following operations.

Operation 31, a preview image frame is acquired, and the brightness level n of each pixel in the preview image frame is determined.

In some embodiments, n brightness levels are preset, the total range of brightness is [0, R max], and the brightness range of each level is $L_n$[bengin, end].

For example, Rmax is related with a sampling precision of pixel brightness, Rmax=255 in this example, n E $[0, R_{max}]$, that is, n may be any value from 1 to 255, n=20 in this example, and n may also be appropriately adjusted according to the calculation capability. The range of the $i^{th}$ brightness level is $[L_i, L_{i+1})$, and the width of the $i^{th}$ brightness level is $R_i$, wherein the width of the $i^{th}$ brightness level is $R_i = L_{i+1} - L_i$, and satisfies $$R\max = \sum_{i=0}^{n-1} R_i.$$

Figure 4:
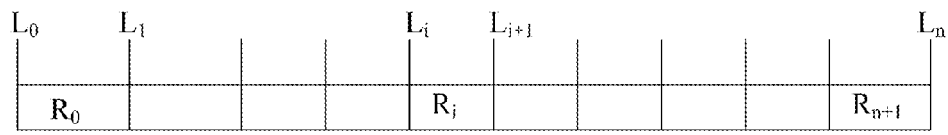
FIG. 4 is a schematic diagram of brightness level distribution in some embodiments of the present disclosure.

FIG. 4 shows a schematic diagram of brightness level distribution in the embodiments of the present disclosure. As shown in FIG. 4, the width of each brightness level may be non-uniformly distributed, and each interval is the width of a brightness level, wherein taking i=1 as an example below for description, at the moment, the width of the $1^{st}$ brightness level is $R_1 = L_2 - L_1$, and the range of the $1^{st}$ brightness level is $[L_1, L_2)$.

Operation 32, an area of a plurality of pixels which are adjacent to each other and belong to the same brightness level is determined as a subarea A(i, j).

In some embodiments, the brightness level of the subarea is i and i∈(0, n), the identification number of the subarea is j and j∈(0, m), wherein m is the total number of subareas of which the brightness levels are i in the preview image frame. Thus, a subarea (generally, the subarea at least includes a pixel) of which the brightness level is any value may be found in the preview image frame through the brightness level and the identification number of the subarea. It could be seen that, the preview image frame is divided into a plurality of subareas which are discrete and consist of a plurality of pixels in the embodiments of the present disclosure.

In some embodiments, taking M=3 as an example, all brightness levels are divided into three brightness class areas, respectively a low brightness class area, a medium brightness class area and a high brightness class area. It should be noted that, the embodiments of the present disclosure only take M=3 as an example but not limited to M=3, and the value of M is determined according to the image processing effect in practical disclosure.

Operation 33, if the brightness level i of the subarea A(i, j) belongs to a first preset brightness range, the subarea is determined as a subarea in the low brightness class area.

In some embodiments, when the brightness level of the subarea A(i, j) is i∈(0, X), the subarea is determined as a subarea in the low brightness class area. In some embodiments of the present disclosure, the low brightness class area may be composed of a plurality of discrete subareas.

Operation 34, if the brightness level i of the subarea A(i, j) belongs to a second preset brightness range, the subarea is determined as a subarea in the medium brightness class area.

In some embodiments, when the brightness level of the subarea A(i, j) is i∈(x+1, y), the subarea is determined as a subarea in the medium brightness class area. In some embodiments of the present disclosure, the medium brightness class area may be composed of a plurality of discrete subareas.

Operation 35, if the brightness level i of the subarea A(i, j) belongs to a third preset brightness range, the subarea is determined as a subarea in the high brightness class area.

In some embodiments, when the brightness level of the subarea A(i, j) is i∈(y+1, R max), the subarea is determined as a subarea in the high brightness class area. In some embodiments of the present disclosure, the high brightness class area may be composed of a plurality of discrete subareas.

It should be noted that, operation 33 to operation 35 do not have a strict execution sequence; and in operation 33 to operation 35, x and y are variable positive numbers.

Operation 36, the feature weight of each class area in the preview image frame is calculated.

In some embodiments, for any class area, the detail feature value of each subarea in the class area is calculated; total detail feature values of all subareas in the class area are counted; the pixel ratio of the number of pixels in the class area to the total number of pixels of the preview image frame is calculated; and the feature weight of the class area in the preview image frame is determined according to the calculated pixel ratio and the counted total detail feature values.

In some embodiments, the detail feature value f(i, j) of the area A(i, j) may be determined by using a gradient value calculation method or an information entropy calculation method, and formula I: f(i, j)=F(A(i, j)). For example, the gradient value calculation formula is as follows:

$$F(M(x, y)) = \sum_{x=0, y=0}^{x=x_{max}, y=y_{max}} (|M(x+1, y) - M(x, y)| + |M(x, y+1) - M(x, y)|),$$

wherein M(x, y) is a pixel matrix included in the A(i, j) area. The total feature value S(i) of areas of which the brightness levels are i in the image frame to be processed is counted according to formula II below, and formula II:

$$S(i) = \sum_{j=1}^{m} f(i, j);$$

the ratio H(i) of all areas of which the brightness levels are i in the image frame to be processed is determined according to formula III below, and formula III:

$$H(i) = \frac{\sum_{j=1}^{m} A(i, j)}{I},$$

wherein I is the total number of pixels in the image frame to be processed, and m is the total number of areas of which the brightness levels are i in the image frame to be processed. The feature weight K(i) of all the areas of which the brightness levels are i in the image frame to be processed is determined according to formula IV below, and formula IV: K(i)=H(i)*S(i).

Operation 37, for any class area, the ratio of the feature weight of the class area to the sum of the feature weights of all the class areas is determined as the feature weight ratio of the class area.

In some embodiments, the feature weight ratio $R_L$ of the low brightness class area to the image frame to be processed is determined according to formula V below, formula V:

$$R_L = \frac{K_L}{K_L + K_M + K_H};$$

the feature weight ratio $R_M$ of the medium brightness class area to the image frame to be processed is determined according to formula VI below; formula VI:

$$R_M = \frac{K_M}{K_L + K_M + K_H};$$

the feature weight ratio $R_H$ of the high brightness class area to the image frame to be processed is determined according to formula VII below, and formula VII:

$$R_H = \frac{K_H}{K_L + K_M + K_H},$$

wherein, $K_L$ is the feature weight of the low brightness class area in the image frame to be processed, $K_M$ is the feature weight of the medium brightness class area in the image frame to be processed, and $K_H$ is the feature weight of the high brightness class area in the image frame to be processed; $K_L$, $K_M$ and $K_H$ are calculated through the above steps.

Operation 38, whether the feature weight ratio of the medium brightness class area is greater than or equal to a first preset threshold is judged; if not, operation 39 is executed; otherwise, operation 313 is executed.

Operation 39, the difference absolute value of the feature weight ratio of the low brightness class area and the feature weight ratio of the high brightness class area is calculated, and whether the difference absolute value is smaller than or equal to a second preset threshold is judged; if so, operation 313 is executed; otherwise, operation 310 is executed.

Operation 310, whether the feature weight ratio of the low brightness class area is greater than that of the high brightness class area is judged; if so, operation 311 is executed; otherwise, operation 312 is executed.

Operation 311, e satisfying the maximum of $$CK(e) = \sum_{i=(E-e)*(x/E)}^{i+X/E} K(i)$$

is determined as the exposure adjustment level required when the preview image frame is taken. Operation 314 is directly executed after execution of operation 311.

Operation 312, e satisfying the maximum of $$CK(e) = \sum_{i=y+(e+1)*(RMAX-y)/E}^{i+(RMAX-y)/E} K(i)$$

is determined as the exposure adjustment level required when the preview image frame is taken. Operation 314 is directly executed after execution of operation 312.

Operation 313, the exposure adjustment level required when the preview image frame is taken is determined as zero. Operation 314 is continuously executed after execution of operation 313.

For example, operation 38 to operation 313 may be realized through the following process: whether $R_L \geq R_{lim1}$ is satisfied is judged first, and if so, the exposure adjustment level required when the preview image frame is taken is zero; otherwise, whether $|R_L - R_H| \leq R_{lim2}$ is satisfied is continuously judged, and if so, the exposure adjustment level required when the preview image frame is taken is zero; otherwise, the magnitude relation between $R_L$ and $R_H$ is continuously judged; if $R_L > R_H$, e satisfying the maximum of $$CK(e) = \sum_{i=(E-e)*(x/E)}^{i+X/E} K(i)$$

is determined as the exposure adjustment level required when the preview image frame is taken, wherein $e \subset \{E, E-1, \ldots, 1\}$, and at the moment, the preview image frame includes most detail features; if $R_L < R_H$, e satisfying the maximum of $$CK(e) = \sum_{i=y+(e+1)*(RMAX-y)/E}^{i+(RMAX-y)/E} K(i)$$

is determined as the exposure adjustment level required when the preview image frame is taken, and at the moment, the preview image frame may display most detail features within the recognizable range of human eyes, wherein $e \subset \{E, E-1, \ldots, 1\}$; and if $R_L = R_H$, the exposure adjustment level required when the preview image frame is taken is zero, and at the moment, the preview image frame may display most detail features within the recognizable range of human eyes, wherein e is the exposure adjustment level, $e \in \{-E, -E+1, \ldots, -1, 0, 1, E-1, E\}$, and E is a preset adjustable positive number.

In some embodiments of the present disclosure, $R_{lim1}$ is the first preset threshold, $R_{lim2}$ is the second preset threshold, namely both $R_{lim1}$ and $R_{lim2}$ are preset thresholds. For example, when $R_{lim1}$ is 50%, it could be considered that the ratio of the medium brightness class area to the preview image frame is about half; and when $R_{lim2}$ is 0, it could be considered that the ratios of the high brightness class area and the low brightness class area to the preview image frame are basically identical. Thus, in some embodiments of the present disclosure, the distribution condition of each brightness class area may be determined, the adjustment trend of image brightness is determined according to the distribution condition above, and the exposure adjustment level is further determined, so that more detail features are displayed to the recognizable range of human eyes.

Operation 314, the pre-acquired exposure parameter is adjusted according to the determined exposure adjustment level, and an image is taken according to the adjusted exposure parameter.

After the exposure adjustment level is determined, the adjusted exposure parameter $AE_{adj} = AE + e$ is determined according to the preset exposure parameter AE and the determined exposure adjustment level e, and the brightness for taking the preview image frame is controlled and processed according to the adjusted exposure parameter $AE_{adj}$. It may be considered that, when $e=0$, $AE_{adj}=AE$, the exposure parameter at the moment does not need to be adjusted, and image brightness processing may be directly performed on the preview image frame according to the preset exposure parameter. When the determined exposure adjustment level e is negative, the pre-acquired exposure parameter is attenuated according to the exposure adjustment level, and taking is performed according to the attenuated exposure parameter, namely the exposure time length used when the preview image frame is taken is shortened according to the exposure adjustment level; and because the exposure time length when the image is taken is shortened, the brightness of the shot image is relatively reduced. When the determined exposure adjustment level e is positive, the pre-acquired exposure parameter is compensated according to the exposure adjustment level, and taking is performed according to the compensated exposure parameter, namely the exposure time length used when the preview image frame is taken is prolonged according to the exposure adjustment level; and because the exposure time length when the image is taken is prolonged, the brightness of the shot image is relatively improved.

It should be noted that, the main object of some embodiments of the present disclosure is to adjust the exposure parameter in the prior art according to the determined exposure adjustment level and perform image taking according to the adjusted exposure parameter; and compared with the prior art, the sensitive time length (namely the exposure time length) of a sensor for taking during image taking is prolonged or shortened when the adjusted exposure parameter is used for taking, so that the purpose of controlling the brightness of the shot image is achieved. The exposure parameter in some embodiments of the present disclosure is the sensitive time of a film to light during imaging, generally using time as a unit, wherein the determination of the exposure parameter is a dynamic acquisition process, and is related with the brightness of the current scenario and the set target brightness. Under the condition of automatic exposure, the exposure parameter is generally 1/7.5 s~1/30 s, and the value of the exposure parameter may be related with the supporting condition of the sensor. Exposure level adjustment is adjustment of the obtained exposure parameter on the basis of the obtained exposure parameter. The exposure adjustment level is generally divided into five levels, namely −2, −1, 0, 1, 2, but not limited to the five levels above. Generally, because the hardware parameter of each sensor is different, when the exposure parameter is adjusted by using the exposure adjustment level, the adjustment degree is also different. For example, the exposure time difference of any two adjacent exposure adjustment levels may be in a multiple relation or an arithmetic relation. Therefore, the control of the exposure time length needed during image taking is limited by the number of exposure adjustment levels provided by the sensor and the difference relation between the adjacent levels.

Figure 5:
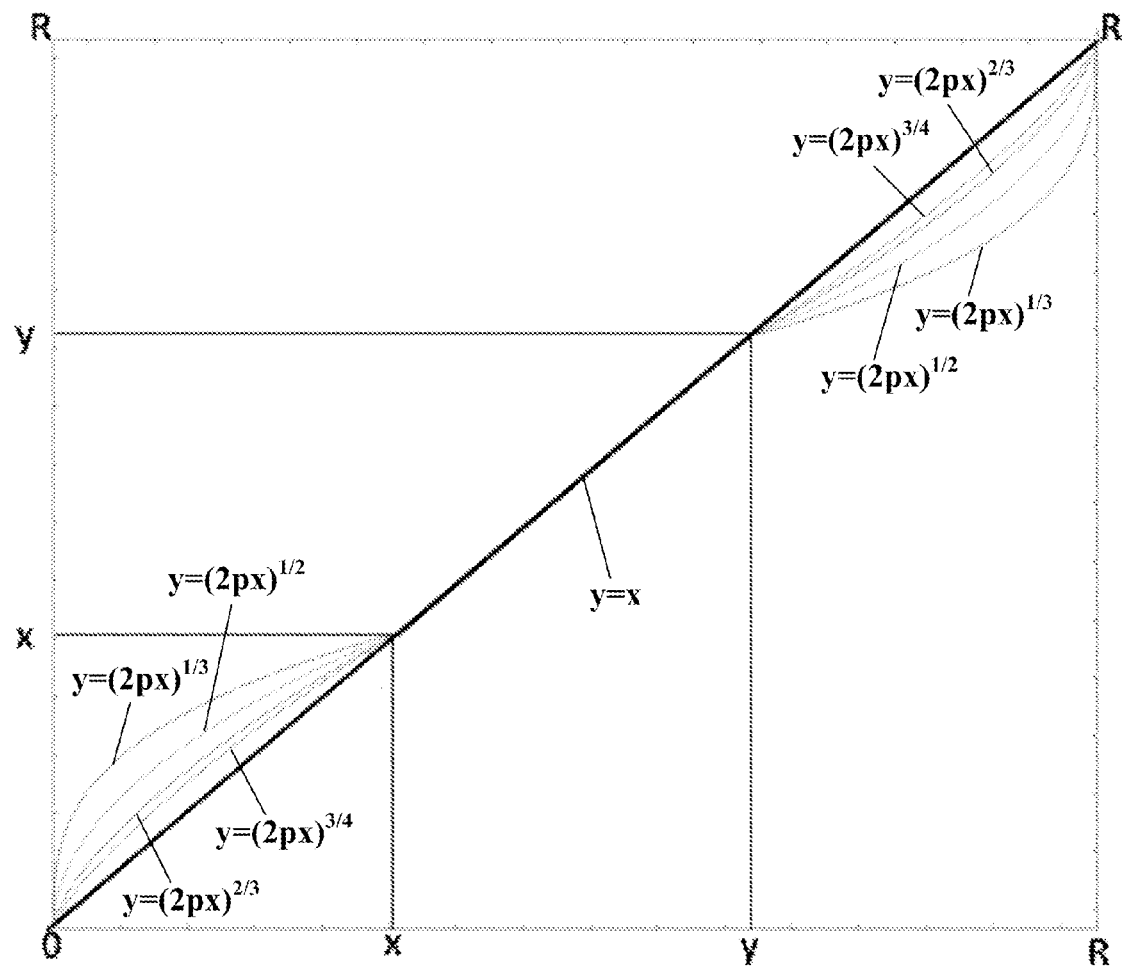
FIG. 5 is a schematic diagram of image brightness processing on a taken image in some embodiments of the present disclosure.

Further, after image taking is performed according to the adjusted exposure parameter, a shot image may be obtained. In some embodiments of the present disclosure, the brightness of the shot image may be processed, so that the brightness value of each pixel in the processed image furthest approaches the preset optimal brightness value. FIG. 5 shows a schematic diagram of image brightness processing on a shot image in some embodiments of the present disclosure. As shown in FIG. 5, X axis is used for expressing original pixel brightness values during image taking, and Y axis is used for identifying pixel brightness values under the control of some embodiments of the present disclosure. Each brightness adjustment curve in FIG. 5 is used for expressing a relation between the original pixel brightness values and the processed pixel brightness values when different image processing models are used, wherein brightness adjustment curves are shown respectively when the image processing models are $y=x$, $y=(2px)^{3/4}$, $y=(2px)^{2/3}$, $y=(2px)^{1/2}$ and $y=(2px)^{1/3}$. In some embodiments of the present disclosure, image brightness processing may be performed according to any image processing model shown in FIG. 5.

Thus, in some embodiments of the present disclosure, a preview image is divided according to brightness levels, detail features (which represent information contents displayed by an image) included in pixel sets of the same brightness level are calculated within a brightness level range, the detail feature values are weighted on the basis of the ratio of the pixel set area of the brightness level in the whole image to obtain different area brightness weighted values, the brightness weighted values of original pixel sets are counted according to three brightness levels to obtain three total brightness weighted values, and the three total brightness weighted values are normalized.

It could be seen from the above solution that, in some embodiments of the present disclosure, an area (namely a subarea $A(i, j)$) of a plurality of pixels which are adjacent to each other and belong to the same brightness level may be determined according to the brightness level n of each pixel in a preview image frame, and all subareas in the preview image frame are divided into M class areas according to a preset brightness range of the brightness levels to which all the subareas in the preview image frame attribute; after each class area is determined, detail features included in each class area may be determined; because different class areas are composed of pixels of the same or similar brightness level, the detail features included in each class area may be used for characterizing the distribution condition of pixels of different brightness levels; the distribution condition in the class areas is discrete, the proportion of each class area in the preview image frame is different, and when the preview image frame has an area with extremely low brightness and an area with extremely high brightness and the proportion of the area with extremely low brightness is much smaller than that of the area with extremely high brightness, if the average metering method in the prior art is adopted, the average brightness of the preview image frame may be regarded as being relatively high, and the preview image frame may be shot after its brightness is reduced; human eyes have different detail distinguishing capabilities for different brightness ranges, and generally, human eyes have relatively weak detail distinguishing capability for the area with relatively low brightness, so that details included in areas with medium brightness may not be recognized by human eyes, the details which may be recognized by human eyes in the shot image are lost, and the definition of the image is passively reduced; still under the above scenario, if the spot metering method in the prior art is adopted, the whole image may be mistakenly judged as an image with relatively high brightness because sampling spots are in an area with relatively high or low brightness, so that the exposure parameter used during taking is mistakenly reduced, more details which may be recognized by human eyes are lost, and the definition of the image is greatly reduced; when an image in a backlight scenario is taken, if the estimated metering method in the prior art is adopted, the exposure parameter may not accord with the practical taking scenario because the brightness of the selected estimation area may not be used for characterizing the brightness of the whole image, so that some details which may be recognized by human eyes are lost; however, detail features included in each class area may be analyzed one by one by using some embodiments of the present disclosure, and the more the divided class areas are (for example, the whole image is divided into 5 or 7 class areas or more), the more the detail features which may be counted in some embodiments of the present disclosure are; and to reveal more detail features, the exposure parameter used during taking may be adjusted according to the distribution condition of enough detail features in some embodiments of the present disclosure, and the brightness of the shot image is controlled according to the practical taking scenario, so that more detail features are revealed and the details of the whole shot image are clear.

Figure 6:
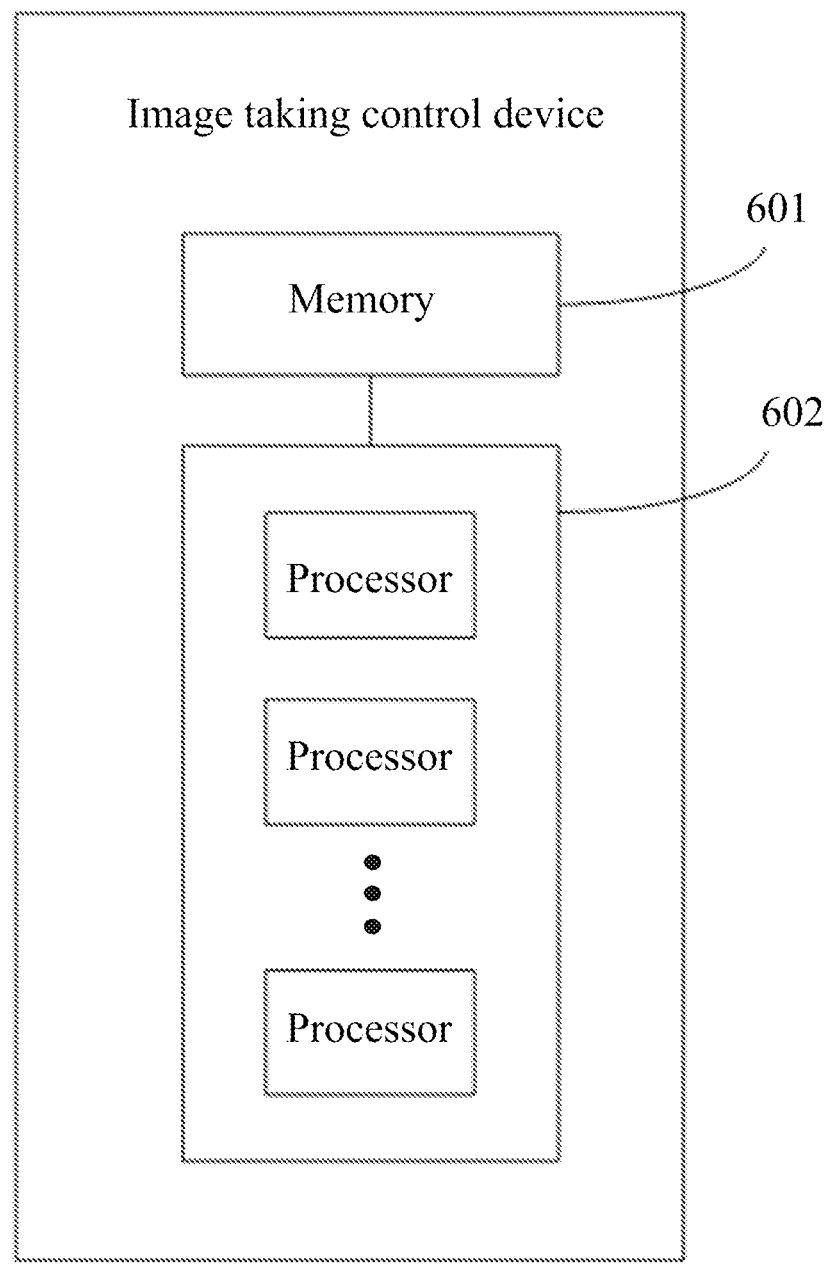
FIG. 6 is a structural schematic diagram of an image taking brightness control device in some embodiments of the present disclosure.

Based on the same technical conception, some embodiments of the present disclosure further provide an image taking control device applied to the above-mentioned method. FIG. 6 shows an image taking control device provided by some embodiments of the present disclosure. As shown in FIG. 6, the device includes a memory 601 and one or more processors 602, wherein the memory 601 stores one or more computer readable program codes, and the one or more processors 602 are used for executing the one or more computer readable program codes to perform:

acquiring a preview image frame, and determining a brightness level n of each pixel in the preview image frame;

dividing the preview image frame into M class areas according to the determined brightness level n of each pixel;

determining an exposure adjustment level required when the preview image frame is taken according to the distribution condition of detail features included in each class area in the preview image frame; and adjusting a pre-acquired exposure parameter according to the determined exposure adjustment level, and taking an image according to the adjusted exposure parameter.

Optionally, the determining an exposure adjustment level required when the preview image frame is taken according to the distribution condition of detail features included in each class area in the preview image frame may include: calculating a feature weight of each class area in the preview image frame; for any class area, determining a ratio of the feature weight of the class area to the sum of the feature weights of all the class areas as the feature weight ratio of the class area; and determining the exposure adjustment level required when the preview image frame is taken according to the feature weight ratio of each class area.

Optionally, the calculating the feature weight of each class area in the preview image frame may include: for any class area, calculating a detail feature value of each subarea in the class area; counting total detail feature values of all subareas in the class area; calculating the pixel ratio of the number of pixels in the class area to a total number of pixels of the preview image frame; and determining the feature weight of the class area in the preview image frame according to the calculated pixel ratio and the counted total detail feature values.

Optionally, the dividing the preview image frame into M class areas according to the determined brightness level n of each pixel may include: determining an area of a plurality of pixels which are adjacent to each other and belong to the same brightness level as a subarea A0, j), wherein the brightness level of the subarea is i and i∈(0, n), an identification number of the subarea is j and j∈(0, m), and m is the total number of subareas of which the brightness levels are i in the preview image frame; and dividing all the subareas in the preview image frame into M class areas according to a preset brightness range of the brightness levels to which all the subareas in the preview image frame attribute.

Optionally, the dividing all the subareas in the preview image frame into M class areas according to a preset brightness range of the brightness levels to which all the subareas in the preview image frame attribute may include: when M=3, dividing the preview image frame into a low brightness class area, a medium brightness class area and a high brightness class area; if the brightness level i of a subarea A(i, j) belongs to a first preset brightness range, determining the subarea as a subarea in the low brightness class area; if the brightness level i of a subarea A(i, j) belongs to a second preset brightness range, determining the subarea as a subarea in the medium brightness class area; and if the brightness level i of a subarea A(i, j) belongs to a third preset brightness range, determining the subarea as a subarea in the high brightness class area.

Optionally, the determining an exposure adjustment level required when the preview image frame is taken includes: if the feature weight ratio of the medium brightness class area is greater than or equal to a first preset threshold, the exposure adjustment level required when the preview image frame is taken being zero; otherwise, calculating the difference absolute value of the feature weight ratio of the low brightness class area and the feature weight ratio of the high brightness class area, and judging whether the difference absolute value is smaller than or equal to a second preset threshold; if so, the exposure adjustment level required when the preview image frame is taken being zero; otherwise, judging whether the feature weight ratio of the low brightness class area is greater than the feature weight ratio of the high brightness class area, if being greater, determining e satisfying a maximum of $$CK(e) = \sum_{i=(E-e)*(x/E)}^{i+x/E} K(i)$$

as the exposure adjustment level required when the preview image frame is taken; if being smaller, determining e satisfying the maximum of $$CK(e) = \sum_{i=y+(e+1)*(RMAX-y)/E}^{i+(RMAX-y)/E} K(i)$$

as the exposure adjustment level required when the preview image frame is taken, wherein e is the exposure adjustment level, e∈{−E, −E+1, ..., −1, 0, 1, ..., E−1, E}, and E is a preset adjustable positive number.

Optionally, the adjusting a pre-acquired exposure parameter according to the determined exposure adjustment level and taking an image according to the adjusted exposure parameter may include: when the determined exposure adjustment level is zero, taking according to the pre-acquired exposure parameter; when the determined exposure adjustment level is negative, attenuating the pre-acquired exposure parameter according to the exposure adjustment level, and taking according to the attenuated exposure parameter; and when the determined exposure adjustment level is positive, compensating the pre-acquired exposure parameter according to the exposure adjustment level, and taking according to the compensated exposure parameter.

Optionally, the attenuating the pre-acquired exposure parameter according to the exposure adjustment level and taking according to the attenuated exposure parameter may include: shortening the exposure time length used when the preview image frame is taken according to the exposure adjustment level;

the compensating the pre-acquired exposure parameter according to the exposure adjustment level and taking according to the compensated exposure parameter may include: prolonging the exposure time length used when the preview image frame is taken according to the exposure adjustment level.

Optionally, after the image is taken according to the adjusted exposure parameter, the one or more processors 602 are also used for executing the one or more computer readable program codes to perform: adjusting the brightness of the shot image according to a preset image processing model.

Figure 7:
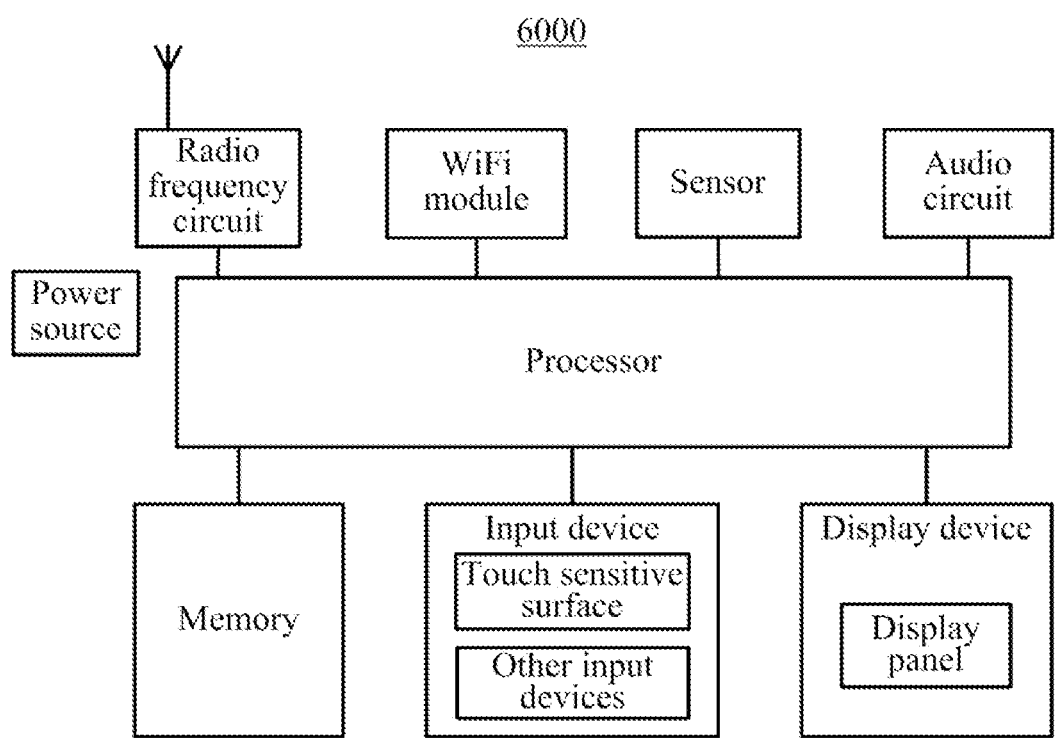
FIG. 7 is a structural schematic diagram of an image taken control device in some embodiments of the present disclosure.

FIG. 7 illustrates an image taken control device in some embodiments of the present disclosure, a terminal 6000 can be any one of various handheld devices (e.g., a mobile phone, a tablet computer, a PDA, etc.) which can include a processor including one or more processing cores, a radio frequency circuit, a memory including one or more computer readable storage mediums, an input device, a display device, a sensor, an audio circuit, a WiFi module, a power source and other components. Those skilled in the art can appreciate that the terminal 600 will not be limited to the structure in this embodiment but can include more or less components or have some of the components combined or different components arranged, where:

The radio frequency circuit can be configured to receive and transmit a signal during receiving and transmitting information or in communication, particularly, the radio frequency circuit transfers downlink information of a base station to the one or more processors for processing upon reception of the downlink information; and also transmits uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The memory can be configured to store software programs and modules, and the processor is configured to run the software programs and modules stored in the memory to thereby perform various function disclosures and data processing. The memory can generally include a program storage area and a data storage area, where an operating system, disclosures required for at least one function (e.g., a function for playing audio, a function for displaying image, etc.), etc., can be stored in the program storage area; and data created for use of the terminal 6000 (e.g., audio data, an address book etc.), etc., can be stored in the data storage area. Moreover the memory can include a high-speed random access memory and can further include a nonvolatile memory, e.g., at least one magnetic-disk memory device, a flash memory device or another volatile solid-state memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. Particularly the input device can include a touch sensitive surface and another input device. The touch sensitive surface, also referred to as a touch display screen or a touch control panel, can be configured to collect a touch operation by a user thereon or in proximity thereto (e.g., an operation by the user on or in proximity to the touch sensitive surface using his or her finger, a stylus or any other appropriate object or attachment) and to drive a corresponding connected device by preset program. Optionally the touch sensitive surface can include two components which are a touch detection device and a touch controller, where the touch detection device detects the position of touching by the user, detects a signal as a result of the touch operation and transfers the signal to the touch controller; and the touch controller receives the touch signal from the touch detection device and converts it into coordinates of a touch point and further transfers them to the processor and can receive and execute a command sent from the processor. Moreover the touch sensitive surface can be embodied in various types of resistive, capacitive, infrared, surface sound wave and other types. The input device can further include another input device in addition to the touch sensitive surface. Particularly the other input device can include but not be limited to one or more of a physical keyboard, functional keys (e.g., volume control press keys, a power-on or -off press key, etc.), a track ball, a mouse, a joystick, etc.

The display device can be configured to display information input by the user or information provided to the user and various graphic user interfaces of the terminal 6000, where these graphic user interfaces can be composed of graphics, texts, icons, videos and any combination thereof. The display device can include a display panel which can be optionally configured in the form of a Liquid Crystal Display (LCD), an Organic Light-Emitting Diode (OLED) display, etc. Furthermore the touch sensitive surface can cover the display panel, and the touch sensitive surface, upon detection of the touch operation thereon or in proximity thereto, transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The terminal 6000 can further include at least one sensor, e.g., an optical sensor, a motion sensor and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 6000 moves nearby an ear. A gravity acceleration sensor which is one motion sensor can detect the magnitudes of accelerations in respective directions (typically three axes) and can detect the magnitude and the direction of gravity when the sensor is stationary and can be configured to perform disclosures of identifying the posture of a mobile phone (e.g., switching between landscape and portrait modes, relevant games, calibration of the posture of a magnetometer, etc.), a relevant function of identifying vibration (e.g., a pedometer, a knock, etc.), etc.; and the terminal 6000 can be further configured with a gyroscope, a barometer, a hygrometer, a thermometer, an infrared sensor and other sensors, and a repeated description of these components will be omitted here.

The audio circuit, a speaker and a microphone can provide an audio interface between the user and the terminal 6000. The audio circuit can convert received audio data into an electric signal and transmit the electric signal to the speaker, which is converted by the speaker into an audio signal for output; and on the other hand, the microphone converts a collected audio signal into an electric signal which is received by the audio circuit and then converted into audio data, and the audio data is further output to the processor for processing and then transmitted to another apparatus through the radio frequency circuit, for example, or the audio data is output to the memory for further processing. The audio circuit may further include an earphone jack for communication between a peripheral earphone and the terminal 6000.

The WiFi is a technology of short-range wireless transmission, and the terminal 6000 can assist the user in receiving and transmitting an e-mail, browsing a webpage, accessing streaming media, etc., through the WiFi module, and the user is provided with a wireless access to the broadband Internet by the WiFi module. Although the WiFi module is illustrated in this embodiment, it can be appreciated that the WiFi module may not be necessarily required for the terminal 6000 but can be omitted as desired without departing from the scope of the disclosure.

The processor is a control component of the terminal 6000, has the respective components connected by various interfaces and lines, and runs or executes the software programs and/or modules stored in the memory and invokes the data stored in the memory to perform the various functions of the terminal 6000 and process the data to thereby manage and control the terminal as a whole. Optionally the processor can include one or more processing cores; and optionally the processor can be integrated with an disclosure processor and a modem processor, where the disclosure processor generally handles the operating system, the user interfaces, the disclosures, etc., and the modem processor generally handles wireless communication. As can be appreciated, the modem processor above may not be integrated into the processor.

The terminal 6000 further includes a power source (e.g., a battery) powering the respective components, and optionally the power source can be logically connected with the processor through a power management system to thereby perform charging and discharging management, power consumption management, etc., through the power management system. The power source can further include one or more DC or AC power sources, recharging systems, power source failure detection circuits, power source transformers or inverters, power source status indicators and any other components.

Although not illustrated, the terminal 6000 can further include a camera, a Bluetooth module, etc., and a repeated description thereof is omitted here. Particularly in this embodiment, the display device of the terminal 6000 is a touch screen display, and the terminal 6000 further includes a memory and one or more programs stored in the memory and configured to be executed by one or more processors.

The embodiments of the disclosure could determine an area (namely a subarea AO, j)) of a plurality of pixels which are adjacent to each other and belong to the same brightness level according to the brightness level n of each pixel in the preview image frame, and divide all the subareas in the preview image frame into M class areas according to the brightness level n of each subareas in the preview image; after determines the class areas, some embodiments of the disclosure could determines the detail features included in each class area, since different class area is consisted of pixels with same or similar lightness level, thus the detail features in each class area could be configured to the distribution situation of pixels in different lightness level, since the distribution situation in the class areas is discrete, and the ratios of each class area in the preview image frame are different, using the method in the prior art to test the light will only perform a reasonable exposure to parts of the class areas, and the detail features could be show is less. However, in some embodiments of the disclosure, the detail features of each class area could be analyzed one-by-one, the more class areas (for example, the image is divided to five class areas, seven class areas, etc.) the more detail features could be count in some embodiments of the disclosure, some embodiments of the disclosure could adjust the exposure parameter used when takes the image according to enough distribution situation of the detail features, and control the lightness of the taken image according to the factual scene, thus more detail features could be show, and the details of the image is clear, thus the performance of the device for image taking brightness control is improved.

Moreover, some embodiments of the present disclosure further provide a computer readable storage medium in which instruction codes are stored, wherein when the instruction codes are executed, user equipment at least carries out the following operation:

acquiring a preview image frame, and determining the brightness level n of each pixel in the preview image frame;

dividing the preview image frame into M class areas according to the determined brightness level n of each pixel;

determining an exposure adjustment level required when the preview image frame is taken according to the distribution condition of detail features included in each class area in the preview image frame; and adjusting a pre-acquired exposure parameter according to the determined exposure adjustment level, and taking an image according to the adjusted exposure parameter.

In some embodiments, the determining an exposure adjustment level required when the preview image frame is taken according to the distribution condition of detail features included in each class area in the preview image frame includes:

calculating the feature weight of each class area in the preview image frame;

for any class area, determining the ratio of the feature weight of the class area to the sum of the feature weights of all the class areas as the feature weight ratio of the class area; and determining the exposure adjustment level required when the preview image frame is taken according to the feature weight ratio of each class area.

In addition, in the above-mentioned embodiments, the calculating the feature weight of each class area in the preview image frame may include: for any class area, calculating the detail feature value of each subarea in the class area; counting total detail feature values of all subareas in the class area; calculating the pixel ratio of the number of pixels in the class area to the total number of pixels of the preview image frame; and determining the feature weight of the class area in the preview image frame according to the calculated pixel ratio and the counted total detail feature values.

The dividing the preview image frame into M class areas according to the determined brightness level n of each pixel may include: determining an area of a plurality of pixels which are adjacent to each other and belong to the same brightness level as a subarea A(i, j), wherein the brightness level of the subarea is i and i∈(0, n), the identification number of the subarea is j and j∈(0, m), and m is the total number of subareas of which the brightness levels are i in the preview image frame; and dividing all the subareas in the preview image frame into M class areas according to a preset brightness range of the brightness levels to which all the subareas in the preview image frame attribute.

The dividing all the subareas in the preview image frame into M class areas according to a preset brightness range of the brightness levels to which all the subareas in the preview image frame attribute may include: when M=3, dividing the preview image frame into a low brightness class area, a medium brightness class area and a high brightness class area; if the brightness level i of a subarea A(i, j) belongs to a first preset brightness range, determining the subarea as a subarea in the low brightness class area; if the brightness level i of a subarea A(i, j) belongs to a second preset brightness range, determining the subarea as a subarea in the medium brightness class area; and if the brightness level i of a subarea A(i, j) belongs to a third preset brightness range, determining the subarea as a subarea in the high brightness class area.

The determining an exposure adjustment level required when the preview image frame is taken includes: if the feature weight ratio of the medium brightness class area is greater than or equal to a first preset threshold, the exposure adjustment level required when the preview image frame is taken being zero; otherwise, calculating the difference absolute value of the feature weight ratio of the low brightness class area and the feature weight ratio of the high brightness class area, and judging whether the difference absolute value is smaller than or equal to a second preset threshold; if so, the exposure adjustment level required when the preview image frame is taken being zero; otherwise, judging whether the feature weight ratio of the low brightness class area is greater than the feature weight ratio of the high brightness class area, if being greater, determining e satisfying the maximum of $$CK(e) = \sum_{i=(E-e)*(x/E)}^{i+x/E} K(i)$$

as the exposure adjustment level required when the preview image frame is taken; if being smaller, determining e satisfying the maximum of $$CK(e) = \sum_{i=y+(e+1)*(RMAX-y)/E}^{i+(RMAX-y)/E} K(i)$$

as the exposure adjustment level required when the preview image frame is taken, wherein e is the exposure adjustment level, e∈{−E, −E+1, . . . , −1, 0, 1, E−1, E}, and E is a preset adjustable positive number.

The adjusting a pre-acquired exposure parameter according to the determined exposure adjustment level and taking an image according to the adjusted exposure parameter may include: when the determined exposure adjustment level is zero, taking according to the pre-acquired exposure parameter; when the determined exposure adjustment level is negative, attenuating the pre-acquired exposure parameter according to the exposure adjustment level, and taking according to the attenuated exposure parameter; and when the determined exposure adjustment level is positive, compensating the pre-acquired exposure parameter according to the exposure adjustment level, and taking according to the compensated exposure parameter.

The attenuating the pre-acquired exposure parameter according to the exposure adjustment level and taking according to the attenuated exposure parameter may include: shortening the exposure time length used when the preview image frame is taken according to the exposure adjustment level; and the compensating the pre-acquired exposure parameter according to the exposure adjustment level and taking according to the compensated exposure parameter may include: prolonging the exposure time length used when the preview image frame is taken according to the exposure adjustment level.

After the image is taken according to the adjusted exposure parameter, it may further include: adjusting the brightness of the shot image according to a preset image processing model.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for image taking brightness control, comprising:
acquiring a preview image frame, and determining a brightness level n of each pixel in the preview image frame;
dividing the preview image frame into M class areas according to the determined brightness level n of each pixel;
calculating a feature weight for each class area in the preview image frame, wherein calculating includes, for any one of the class areas, calculating a detail feature value of each subarea in the class area, counting total detail feature values of all subareas in the class area, calculating a pixel ratio of a number of pixels in the class area to a total number of pixels of the preview image frame, and determining the feature weight of the class area in the preview image frame according to the calculated pixel ratio and the counted total detail feature values;
for any one of the class areas, determining a ratio of the feature weight of the class area to the sum of the feature weights of all class areas as a feature weight ratio of the class area;
determining an exposure adjustment level required when the preview image frame is taken according to the feature weight ratio of each class area; and
adjusting a pre-acquired exposure parameter according to the determined exposure adjustment level, and taking an image according to the adjusted exposure parameter.

2. The method of claim 1, wherein the dividing the preview image frame into M class areas according to the determined brightness level n of each pixel comprises:
determining an area of a plurality of pixels which are adjacent to each other and belong to the same brightness level as a subarea A(i, j), wherein the brightness level of the subarea is i and i∈(0, n), an identification number of the subarea is j and j∈(0, m), and m is the total number of subareas of which the brightness levels are i in the preview image frame; and
dividing all the subareas in the preview image frame into M class areas according to a preset brightness range of the brightness levels to which all the subareas in the preview image frame attribute.

3. The method of claim 2, wherein the dividing all the subareas in the preview image frame into M class areas according to a preset brightness range of the brightness levels to which all the subareas in the preview image frame attribute comprises: when M=3, dividing the preview image frame into a low brightness class area, a medium brightness class area and a high brightness class area;
if the brightness level i of a subarea A(i, j) belongs to a first preset brightness range, determining the subarea as a subarea in the low brightness class area;

if the brightness level i of a subarea A0, j) belongs to a second preset brightness range, determining the subarea as a subarea in the medium brightness class area; and if the brightness level i of a subarea A(i, j) belongs to a third preset brightness range, determining the subarea as a subarea in the high brightness class area.

4. The method of claim 1, wherein the determining an exposure adjustment level required when the preview image frame is taken comprises:

if the feature weight ratio of the medium brightness class area is greater than or equal to a first preset threshold, the exposure adjustment level required when the preview image frame is taken being zero; otherwise, calculating the difference absolute value of the feature weight ratio of the low brightness class area and the feature weight ratio of the high brightness class area, and judging whether a difference absolute value is smaller than or equal to a second preset threshold; if so, the exposure adjustment level required when the preview image frame is taken being zero; otherwise, judging whether the feature weight ratio of the low brightness class area is greater than the feature weight ratio of the high brightness class area, if being greater, determining e satisfying the maximum of $$CK(e) = \sum_{i=(E-e)*(x/E)}^{i+x/E} K(i)$$

as the exposure adjustment level required when the preview image frame is taken; if being smaller, determining e satisfying the maximum of $$CK(e) = \sum_{i=y+(e+1)*(RMAX-y)/E}^{i+(RMAX-y)/E} K(i)$$

as the exposure adjustment level required when the preview image frame is taken, wherein e is the exposure adjustment level, $e \in \{-E, -E+1, \ldots, -1, 0, 1, E-1, E\}$, and E is a preset adjustable positive number.

5. The method of claim 4, wherein the adjusting a pre-acquired exposure parameter according to the determined exposure adjustment level and taking an image according to the adjusted exposure parameter comprises:

when the determined exposure adjustment level is zero, taking according to the pre-acquired exposure parameter;

when the determined exposure adjustment level is negative, attenuating the pre-acquired exposure parameter according to the exposure adjustment level, and taking according to the attenuated exposure parameter; and when the determined exposure adjustment level is positive, compensating the pre-acquired exposure parameter according to the exposure adjustment level, and taking according to the compensated exposure parameter.

6. The method of claim 5, wherein the attenuating the pre-acquired exposure parameter according to the exposure adjustment level and taking according to the attenuated exposure parameter comprises:

shortening an exposure time length used when the preview image frame is taken according to the exposure adjustment level; and the compensating the pre-acquired exposure parameter according to the exposure adjustment level and taking according to the compensated exposure parameter comprises:

prolonging the exposure time length used when the preview image frame is taken according to the exposure adjustment level.

7. The method of claim 1, wherein after the image is taken according to the adjusted exposure parameter, the method further comprises:

adjusting the brightness of the shot image according to a preset image processing model.

8. An image taking control device, comprising a memory and one or more processors, wherein the memory stores one or more computer readable program codes, and the one or more processors are used for executing the one or more computer readable program codes to perform:

acquiring a preview image frame, and determining the brightness level n of each pixel in the preview image frame;

dividing the preview image frame into M class areas according to the determined brightness level n of each pixel;

respectively calculating a feature weight of each class area in the preview image frame, wherein calculating includes, for any one of the class areas, calculating a detail feature value of each subarea in the class area, counting total detail feature values of all subareas in the class area, calculating a pixel ratio of a number of pixels in the class area to a total number of pixels of the preview image frame, and determining the feature weight of the class area in the preview image frame according to the calculated pixel ratio and the counted total detail feature values;

for any one of the class areas, determining a ratio of the feature weight of the class area to the sum of the feature weights of all class areas as a feature weight ratio of the class area; and determining an exposure adjustment level required when the preview image frame is taken according to the feature weight ratio of each class area; and adjusting a pre-acquired exposure parameter according to the determined exposure adjustment level, and taking an image according to the adjusted exposure parameter.

9. The device of claim 8, wherein the dividing the preview image frame into M class areas according to the determined brightness level n of each pixel comprises:

determining an area of a plurality of pixels which are adjacent to each other and belong to the same brightness level as a subarea A(i, j), wherein the brightness level of the subarea is i and $i \in (0, n)$, an identification number of the subarea is j and $j \in (0, m)$, and m is the total number of subareas of which the brightness levels are i in the preview image frame; and dividing all the subareas in the preview image frame into M class areas according to a preset brightness range of the brightness levels to which all the subareas in the preview image frame attribute.

10. The device of claim 9, wherein the dividing all the subareas in the preview image frame into M class areas according to a preset brightness range of the brightness levels to which all the subareas in the preview image frame attribute comprises: when M=3, dividing the preview image frame into a low brightness class area, a medium brightness class area and a high brightness class area;
  if the brightness level i of the subarea A(i, j) belongs to a first preset brightness range, determining the subarea as a subarea in the low brightness class area;
  if the brightness level i of the subarea A(i, j) belongs to a second preset brightness range, determining the subarea as a subarea in the medium brightness class area; and
  if the brightness level i of the subarea A(i, j) belongs to a third preset brightness range, determining the subarea as a subarea in the high brightness class area.

11. The device of claim 8, wherein the determining an exposure adjustment level required when the preview image frame is taken comprises:
  if the feature weight ratio of the medium brightness class area is greater than or equal to a first preset threshold, the exposure adjustment level required when the preview image frame is taken being zero; otherwise, calculating the difference absolute value of the feature weight ratio of the low brightness class area and the feature weight ratio of the high brightness class area, and judging whether a difference absolute value is smaller than or equal to a second preset threshold; if so, the exposure adjustment level required when the preview frame is taken being zero; otherwise, judging whether the feature weight ratio of the low brightness class area is greater than the feature weight ratio of the high brightness class area, if being greater, determining e satisfying the maximum of $$CK(e) = \sum_{i=(E-e)*(x/E)}^{i+x/E} K(i)$$

as the exposure adjustment level required when the preview image frame is taken; if being smaller, determining e satisfying the maximum of $$CK(e) = \sum_{i=y+(e+1)*(RMAX-y)/E}^{i+(RMAX-y)/E} K(i)$$

as the exposure adjustment level required when the preview image frame is taken,
  wherein e is the exposure adjustment level, $e \Sigma \{-E, -E+1, \ldots, -1, 0, 1, E-1, E\}$, and E is a preset adjustable positive number.

12. The device of claim 11, wherein the adjusting a pre-acquired exposure parameter according to the determined exposure adjustment level and taking an image according to the adjusted exposure parameter comprises:
  when the determined exposure adjustment level is zero, taking according to the pre-acquired exposure parameter;
  when the determined exposure adjustment level is negative, attenuating the pre-acquired exposure parameter according to the exposure adjustment level, and taking according to the attenuated exposure parameter; and
  when the determined exposure adjustment level is positive, compensating the pre-acquired exposure parameter according to the exposure adjustment level, and taking according to the compensated exposure parameter.

13. The device of claim 12, wherein the attenuating the pre-acquired exposure parameter according to the exposure adjustment level and taking according to the attenuated exposure parameter comprises:
  shortening an exposure time length used when the preview image frame is taken according to the exposure adjustment level; and
  the compensating the pre-acquired exposure parameter according to the exposure adjustment level and taking according to the compensated exposure parameter comprises:
  prolonging the exposure time length used when the preview image frame is taken according to the exposure adjustment level.

14. The device of claim 8, wherein after the image is taken according to the adjusted exposure parameter, the one or more processors are also used for executing the one or more computer readable program codes to perform:
  adjusting the brightness of the shot image according to a preset image processing model.

15. A non-transitory computer readable storage medium in which instruction codes are stored, wherein when the instruction codes are executed, user equipment at least carries out the following operations:
  acquiring a preview image frame, and determining a brightness level n of each pixel in the preview image frame;
  dividing the preview image frame into M class areas according to the determined brightness level n of each pixel;
  calculating a feature weight for each class area in the preview image frame, wherein calculating includes, for any one of the class areas, calculating a detail feature value of each subarea in the class area, counting total detail feature values of all subareas in the class area, calculating a pixel ratio of a number of pixels in the class area to a total number of pixels of the preview image frame, and determining the feature weight of the class area in the preview image frame according to the calculated pixel ratio and the counted total detail feature values;
  for any one of the class areas, determining a ratio of the feature weight of the class area to the sum of the feature weights of all class areas as a feature weight ratio of the class area;
  determining an exposure adjustment level required when the preview image frame is taken according to the feature weight ratio of each class area; and
  adjusting a pre-acquired exposure parameter according to the determined exposure adjustment level, and taking an image according to the adjusted exposure parameter.

* * * * *